(12) United States Patent
Ranalli et al.

(10) Patent No.: US 6,285,500 B1
(45) Date of Patent: Sep. 4, 2001

(54) WAVELENGTH SELECTIVE SWITCH

(75) Inventors: Eliseo R. Ranalli, Irvine; Bradley A. Scott, Huntington Beach, both of CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/450,142

(22) Filed: Nov. 29, 1999

Related U.S. Application Data
(60) Provisional application No. 60/141,556, filed on Jun. 29, 1999.

(51) Int. Cl.[7] .................................................. G02B 5/30
(52) U.S. Cl. ....................... 359/497; 359/127; 359/494; 359/499; 385/11
(58) Field of Search ................................. 359/124, 127, 359/128, 130, 246, 494, 495, 497, 499; 385/11

(56) References Cited

U.S. PATENT DOCUMENTS

| | | |
|---|---|---|
| 4,783,851 * | 11/1988 | Inou et al. ............................ 359/495 |
| 4,917,452 | 4/1990 | Liebowitz . |
| 5,377,026 | 12/1994 | Liu et al. . |
| 5,414,540 | 5/1995 | Patel et al. . |
| 5,606,439 | 2/1997 | Wu . |
| 5,694,233 | 12/1997 | Wu et al. . |
| 5,724,165 | 3/1998 | Wu . |
| 5,867,291 | 2/1999 | Liu et al. . |

FOREIGN PATENT DOCUMENTS

| | | |
|---|---|---|
| WO9833289 | 7/1998 | (WO) . |
| WO9835251 | 8/1998 | (WO) . |

\* cited by examiner

*Primary Examiner*—Darren Schuberg
(74) *Attorney, Agent, or Firm*—Daniel P. Malley (57) ABSTRACT

A reconfigurable bi-directional wavelength selective switch is disclosed. It has an optical system that is symmetric about a polarization modulator. The symmetric optical system consists of an input birefringent optical system and output birefringent optical system disposed around polarization modulator. The optical system delivers the wavelength channels that are to be switched as a superimposed wavelength channel incident the polarization modulator. As a result, crosstalk is reduced below −35 dB and greater optical performance is achieved.

35 Claims, 9 Drawing Sheets

WAVELENGTH SELECTIVE SWITCH

CROSS-REFERENCE TO RELATED APPLICATIONS

This Application claims the benefit of priority under 35 U.S.C. §119(e) for U.S. Provisional Patent Application Ser. No. 60/141,556 filed on Jun. 29, 1999, the content of which is relied upon and incorporated herein by reference in its entirety.

BACKGROUND OF THE INVENTION

1. Field of the Invention

The present invention relates generally to optical switches, and particularly to wavelength selective switches using a polarization rotating device.

2. Technical Background

In the past two-decades fiber optics have transformed the telecommunications market place. Initially, network designs included relatively low-speed transceiver electronics at each end of the communications link. Light signals were switched by being converted into electrical signals, switched electronically, and reconverted into light signals. The bandwidth of electronic switching equipment is limited to about 10 GHz. On the other hand, the bandwidth of single mode optical fiber in the 1550 nm region of the electromagnetic spectrum is in the Terahertz range. As the demand for bandwidth increases exponentially, network designers have sought ways to exploit the available bandwidth in the 1550 nm region. Thus, a need exists for optically transparent cross-connects and switches.

One approach that has been considered involves a frequency-selective optical switch employing a polarization beam splitter, Wollaston prism and a liquid crystal switch element. However, this design has a major drawback. The polarizing beam splitter, which is used to recombine the beams, is always located between the focusing lens and the spatial light modulator. One effect of this is that the polarizing beamsplitter must be able to accept a large acceptance angle, which leads to poorly superimposed beams if birefringent crystals are used. If beamsplitting cubes are used contrast ratio is reduced and crosstalk is increased. This was addressed by using a Wollaston Prism. Wollaston Prisms are designed to convert a collimated beam of mixed polarization into two deflected collimated beams, which are separated by an angle that is roughly bisected by the optical axis of the original mixed polarization beam. This solves many of the problems associated with placing the polarizing beam separator between the focusing lens and the LC switch element, but there are substantial problems associated with using Wollaston Prisms. The most significant of these lies is the fact Wollaston Prisms cannot produce beams that are exactly symmetrically deflected. Because the effect of the Wollaston Prism is not symmetrical, the beams cannot be superimposed at the LC switch element. Thus, the positions of the beams at the LC switch element must be balanced with the differing angles of incidence at the LC switch element to minimize crosstalk and insertion loss variation for the different switched states. Due to this asymmetry, the optical system must grow to unattractively long lengths in order to achieve acceptable crosstalk with an acceptable channel bandwidth.

Thus, what is needed is a wavelength selective switch having an optical system that is symmetric about a polarization modulator and capable of delivering superimposed beams at the polarization modulator in order to reduce crosstalk, reduce insertion loss, and improve spectral resolution.

SUMMARY OF THE INVENTION

A wavelength selective switch is disclosed that includes an optical system that is symmetric about a polarization modulator and capable of delivering superimposed beams at the polarization modulator in order to reduce crosstalk, reduce insertion loss, and improve spectral resolution.

One aspect of the present invention is an optical device for selectively directing a first signal and a second signal to a selected output. The optical device includes: a birefringent optical system having a system input that receives the first signal and the second signal, and a system output to which the birefringent optical system transmits a superimposed signal formed by superimposing a first polarized signal and a second polarized signal, wherein the first polarized signal and the second polarized signal are polarized versions of the first signal and the second signal, respectively; and a polarization modulator coupled to the system output, whereby the polarization modulator selectively rotates a polarization state of the superimposed signal.

In another aspect, the present invention includes an optical device for selectively directing a first signal and a second signal to a selected output. The optical device includes a first polarization beam splitter for separating the first signal and second signal into first signal polarization components and second signal polarization components, respectively. A first half-wave retarder is coupled to the polarization beam splitter, the first half-wave retarder causes all of the first signal polarization components and the second signal polarization components to be uniformly polarized in a first polarization state. A first grating is coupled to the first half-wave retarder, for producing a plurality of first signal wavelength channels and a plurality of second signal wavelength channels. A second half-wave retarder is coupled to the first grating, for causing the plurality of second signal wavelength channels to be uniformly polarized in a second polarization state. A first optical compensator is coupled to the first grating, for causing an optical distance of the plurality of first signal wavelength channels to be substantially equal to an optical distance of the plurality of second signal wavelength channels. A first polarization beam combiner is coupled to the optical compensator and the second half-wave retarder, for combining the plurality of first signal wavelength channels and the plurality of second signal wavelength channels into a plurality of superimposed wavelength channels. A focusing lens is coupled to the polarization beam combiner; and an array of polarization modulators coupled to the focusing lens, each of the modulators has a switch state, wherein each superimposed wavelength channel is focused onto a predetermined modulator.

In another aspect, the present invention includes a method for selectively directing a first signal and a second signal to a selected output in an optical device. The method includes the following steps. Providing a polarization modulator. Converting the first signal into at least one first polarized component and the second signal into at least one second polarized component. Superimposing the at least one first polarized component with the at least one second polarized component to form a superimposed signal, wherein the at least one first polarized component and the at least one second polarized component are co-linear in at least one axis direction; and focusing the superimposed signal onto the polarization modulator.

In another aspect, the present invention includes a method for selectively directing a first signal and a second signal to a selected output in an optical device that includes a birefringent optical system. The method includes the following steps. Providing an array of liquid crystal pixels, wherein each of the liquid crystal pixels includes a switch state. Demultiplexing the first signal and the second signal to thereby form a plurality of first signal wavelength channels and a plurality of second signal wavelength channels, respectively. Superimposing each first signal wavelength channel over its corresponding second signal wavelength channel to thereby form a plurality of superimposed wavelength channels; and focusing each superimposed wavelength channel onto a predetermined liquid crystal pixel.

The features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that the following detailed description is merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the wavelength selective switch (WSS) of the present invention is shown in FIG. 1, and is designated generally throughout by reference numeral 10.

In accordance with the invention, a wavelength selective cross-connect switch is provided having an optical system that is symmetric about a polarization modulator, and capable of delivering superimposed beams at the polarization modulator 20 in order to reduce crosstalk, reduce insertion loss, and improve spectral resolution to thereby achieve high optical throughput. The present invention for a wavelength selective switch (WSS) includes a birefringent optical system that transmits a superimposed signal to the polarization modulator. The superimposed signal is formed by superimposing a parallel polarized signal from a first input fiber with an orthogonal polarized signal from a second input fiber.

Figure 1:
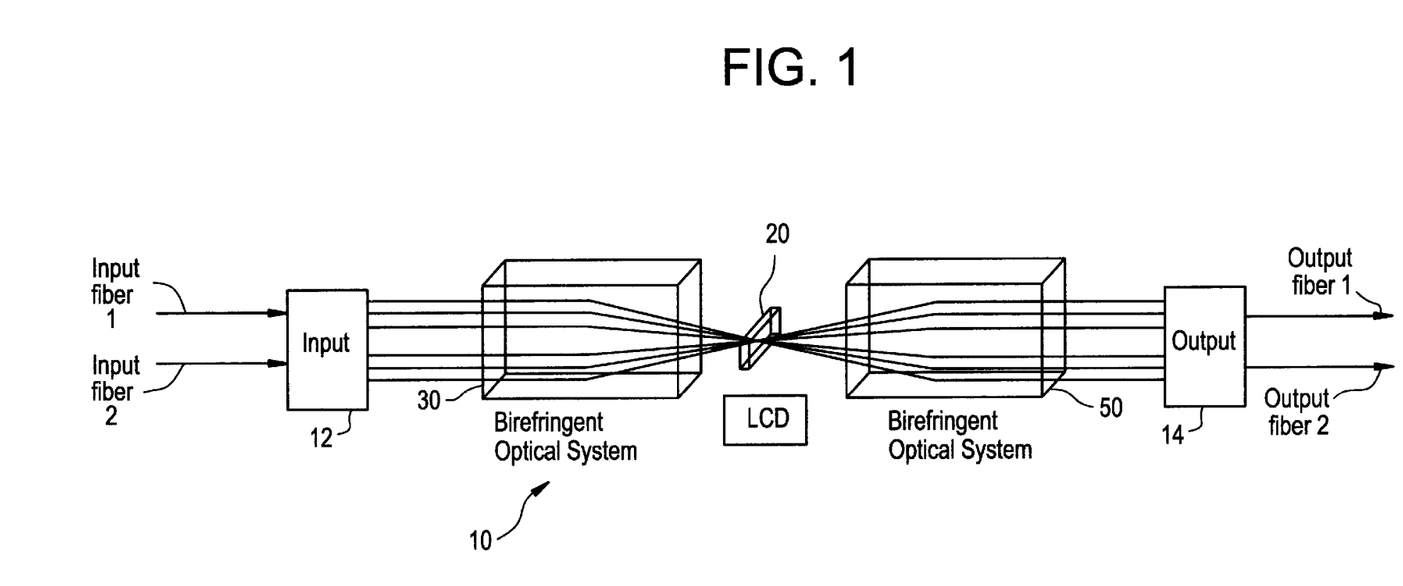
FIG. 1 is a block diagram showing on overview of the Wavelength Selective Switch (WSS) according to a first embodiment of the present invention.

As embodied herein and depicted in FIG. 1, WSS 10 according to the first embodiment of the present invention is disclosed. Input fiber 1 and input fiber 2 are connected to input port 12. Input port 12 is connected to input birefringent optical system 30. Input birefringent optical system 30 is optically coupled to polarization modulator, which switches the incident light beam in accordance to the switch state as determined by network command (not shown). Polarization modulator 20 is connected to output birefringent optical system 50 which routes the output light beams to output port 14. Output port 14 is connected to output fiber 1 and output fiber 2.

Output birefringent optical system 50 is the mirror image of input birefringent optical system 30. Thus, WSS 10 is a reconfigurable bi-directional wavelength selective switch. The birefringent optical system, which consists of input birefringent optical system 30 and output birefringent optical system 50, is exactly symmetric about polarization modulator 20. WSS 10 as depicted in FIG. 1 is a 2×2 Wavelength Selective Switch.

Input fiber 1 and input fiber 2 provide WSS 10 with randomly polarized light signals having multiple wavelength channels. In a first embodiment, WSS 10 accommodates 40 wavelength channels at 100 GHZ spacing between channels. In an alternate embodiment, WSS 10 accommodates 80 wavelength channels at 50 GHZ spacing between channels. Any individual channel may be selectively switched between input fiber 1 and input fiber 2. WSS 10 operates by converting the wavelength channels from input fiber 1 into s-polarized (perpendicular) signals and the second fiber wavelength channels into p-polarized (parallel) signals. One of ordinary skill in the art will recognize that the p-polarized signals and the s-polarized signals are orthogonal one to the other. The p-polarized signals and the s-polarized signals are then superimposed and focused on polarization modulator. Thus, traffic carried by the input fibers is identified by its polarization state. Polarization modulator 20 rotates the polarization state of the superimposed signal by 90° when switching channels between fibers and doesn't rotate the polarization state when a given channel is passed through the switch. After switching, the output birefringent optical system 50 re-multiplexes the wavelength channels according to their polarization state and maps s-polarized output channels (as polarized after leaving polarization modulator 20) to the output fiber 1 and maps p-polarized output channels (as polarized after leaving polarization modulator 20) to the output fiber 2. Because of the symmetrical design, this convention can be reversed. The operation of WSS 10 will be discussed in more detail below.

Figure 2:
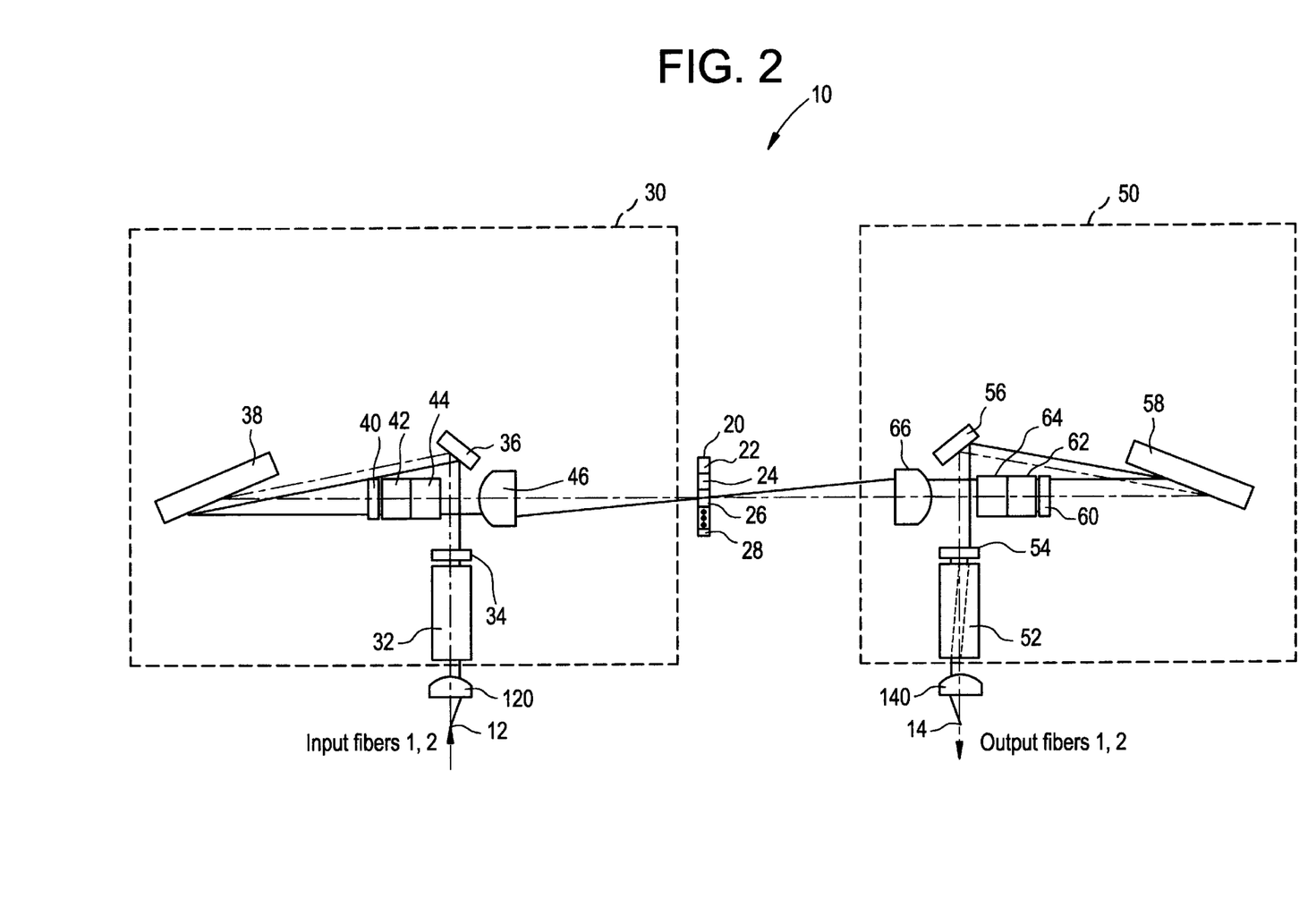
FIG. 2 is a schematic of the WSS depicted in FIG. 1.

As embodied herein and depicted in FIG. 2, a schematic of WSS 10 according to a first embodiment of the present invention is disclosed. Input fiber 1 and input fiber 2 are connected to WSS 10 at input 12. The light signal from fiber 1 and fiber 2 are collimated by collimator 120. Collimator 120 is connected to polarizing beam splitter 32. Polarizing beam splitter 32 is connected to half-wave plate 34. A fold-mirror 36 is optically coupled to polarization beam splitter 32 and half-wave plate 34 causing the light signals to be reflected toward grating 38. As depicted in subsequent embodiments, fold-mirror 36 can be eliminated and the optical signal is directed from half-wave plate 34 to grating 38. Grating 38 demultiplexes the first fiber light signal and the second fiber light signal into its constituent wavelength channels. Half-wave plate 40 and optical compensator 42 are coupled to the grating. Half-wave plate 40 provides an optical path for the second fiber wavelength channels. Optical compensator 42 provides an optical path for the first fiber wavelength channels. The function of these elements will be discussed in more detail below. Half-wave plate 40 and optical compensator 42 are optically coupled to polarization beam combiner 44. Polarization beam combiner 44 superimposes the first fiber wavelength channels coming from half-wave wave plate 40 and the second fiber wavelength channels coming from optical compensator 42. Focusing lens 46 is optically coupled to polarization beam combiner 44 and is used to focus each superimposed wavelength channels exiting polarization beam combiner 44 onto its respective polarization modulating cell 22 of polarization modulator 20.

As discussed above, output birefringent optical system 50 is a mirror image of input birefringent optical system 50. Polarization modulator 20 is connected to focusing lens 66. Focusing lens 66 is coupled to polarization beam splitter 64. Polarization beam splitter separates the superimposed output channels into an output fiber 1 wavelength channel and an output fiber 2 wavelength channel. Polarization beam splitter is coupled to half-wave plate 60 and optical compensator 62. Optical compensator 62 adjusts the optical path length of output fiber 1 wavelength channels. Output fiber 2 wavelength channels propagate through half-wave plate 60. Output fiber 1 wavelength channels and output fiber 2 wavelength channels are multiplexed by grating 58. Grating 58 is coupled to fold-mirror 56 which directs a portion of the output signals through half-wave plate 54. Half-wave plate 54 is coupled to polarization beam combiner 52 which forms output signal 1 and output signal 2. Output signal 1 and output signal 2 are collimated by collimator 140 and directed into the first output fiber and the second output fiber, respectively.

Figure 3:
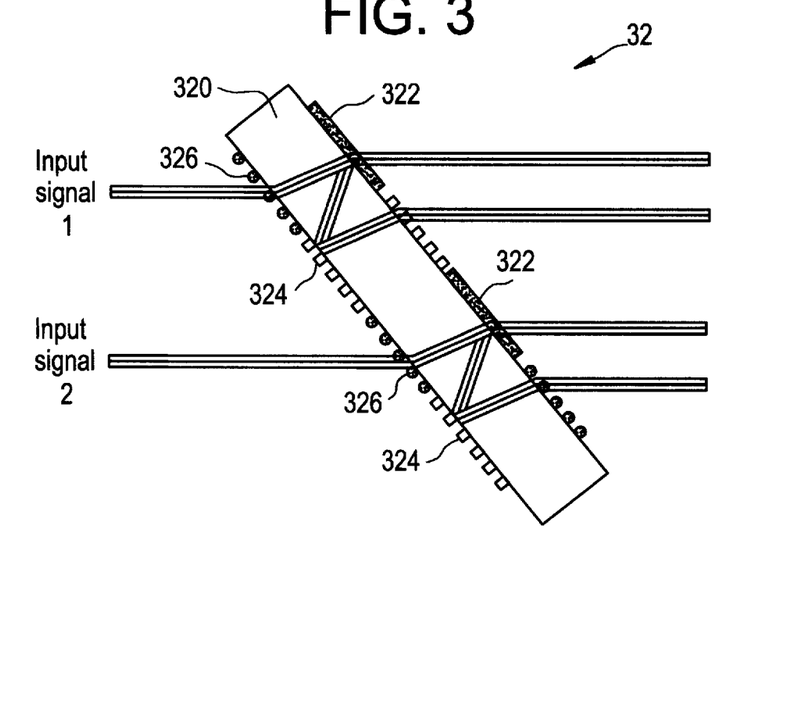
FIG. 3 is a diagram showing a parallel plate beamsplitter in accordance with the present invention.

Polarizing beam splitters 32 and 64, and polarizing beam combiners 44 and 52, may be of any suitable type, but there is shown by way of example, in FIG. 3 beamsplitter 32 having a single plate 320 of light-transmitting material. Plate 320 has parallel sides. An antireflection coating 326 is disposed on the light incident side of input signals 1 and 2. Beamsplitting coating 322 is disposed on the light exiting side of plate 320. Coating 320 allows s-polarized light to pass through while internally reflecting p-polarized light. The p-polarized light is reflected by reflective coating 324. Subsequently, the p-polarized light exits the slab in a beam that is parallel to the s-polarized light. This approach provides arcsecond tolerances, is inexpensive and can be implemented in one part. Beam splitters 32 and 64, and polarizing beam combiners 44 and 52, have been arranged so that all separation and recombination functions occur orthogonal to the color dispersion axis (tilted axis of the grating), which simplifies the optical distance compensation required to minimize insertion loss and insertion loss variation due to switch state. This arrangement improves optical performance because the optical path distance differences between the grating and focusing lens is made identical for all configurations. In addition, beam combiner 44 and splitter 64 are disposed between the grating and the focusing lens.

This innovation provides improved optical performance and eliminates asymmetries associated with the Wollaston Prism, typically found in other designs. Examples of such beamspliiter/combiner devices are disclosed in Provisional Patent Application No. 60/153,913 which is herein incorporated by reference.

One of ordinary skill in the art will recognize that beam splitting cubes, birefringent plates, and prisms, in addition to thin film filters, can also be used depending on the desired tolerances, package size, expense, and mounting requirements. Although the cube approach is more expensive, these devices can be mounted on optical surfaces and have a smaller package size.

Figure 4:
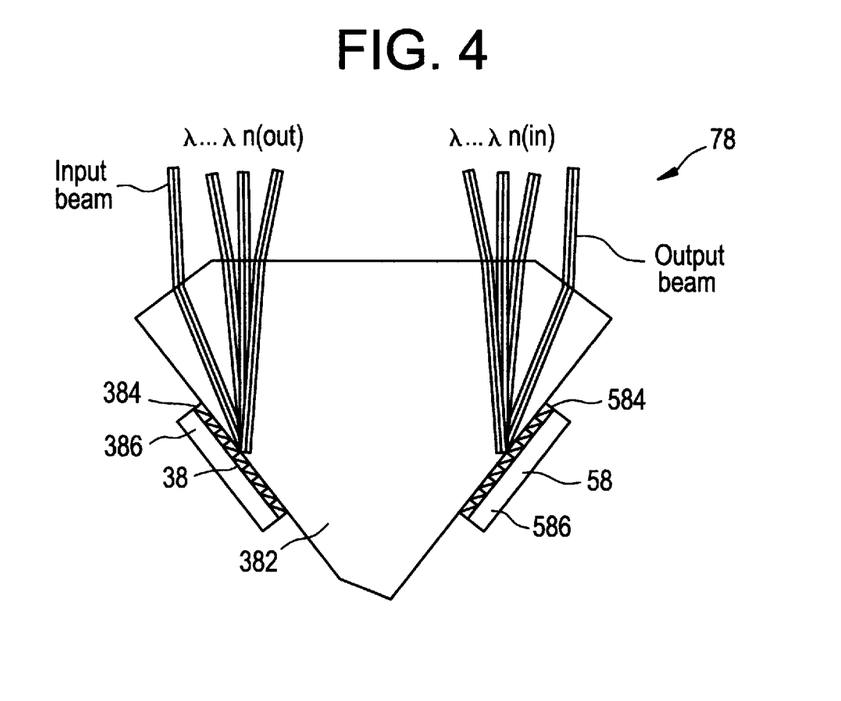
FIG. 4 is a diagram showing an a thermalized grating in accordance with the present invention.
Figure 6:
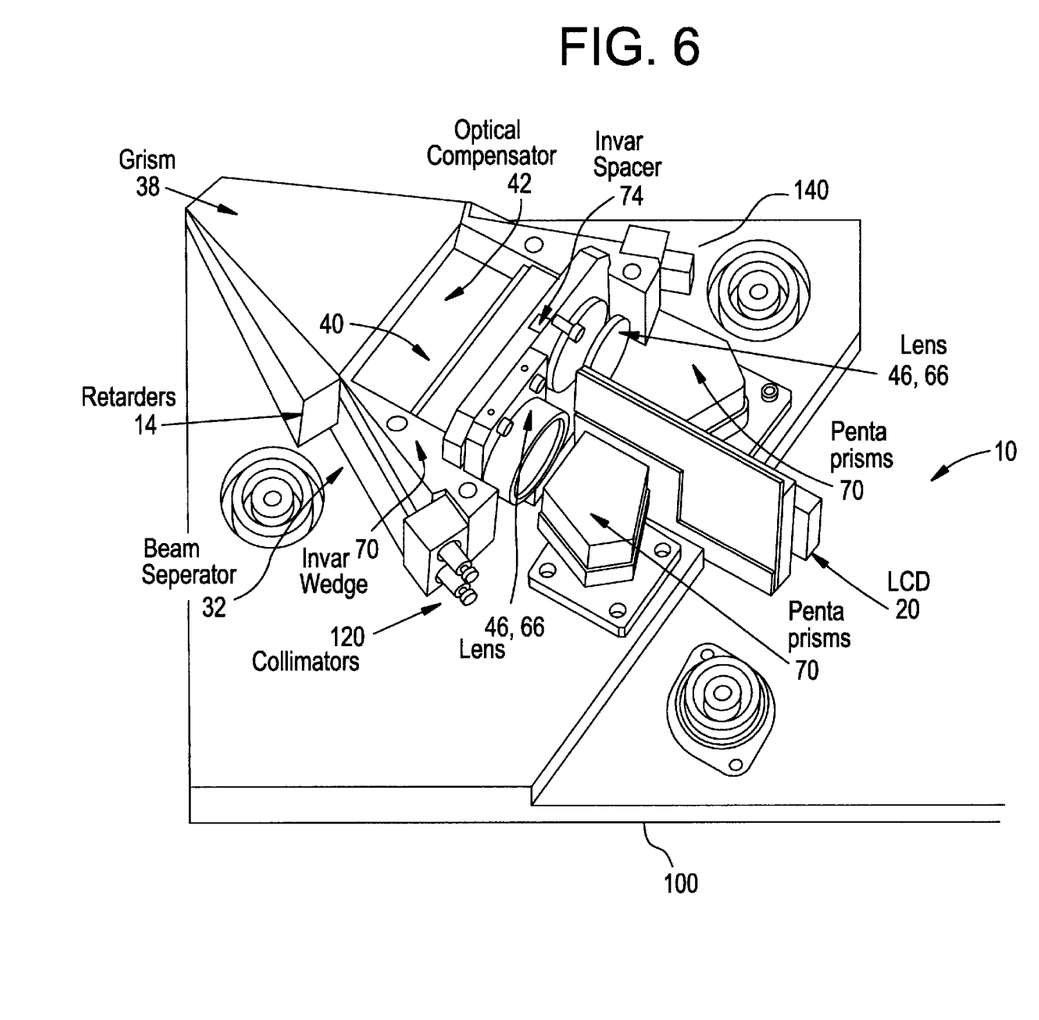
FIG. 6 is a perspective view of the mechanical design of the WSS in accordance with a second embodiment of the present invention.

Gratings 38 and 58 may be of any suitable type, but there is disclosed, by way of example in FIG. 4, an athermalized grism 78 that includes input grating 38 and output grating 58 in one package as depicted in FIG. 6. In this embodiment, input grating 38 is replicated onto substrate 386 and mated to prism 382 by epoxy 384. The CTE of the grating spacing is intermediate between the CTE of the prism material and the CTE of the substrate material. By varying the thickness of the substrate material the CTE of the grating spacing can be controlled. The glass used for the prism should have a low dn/dt. For example, prism 382 can be implemented using Ohara glass type S-TIL6 and Corning ULE glass for the substrate 386 (586). The angle of the light entrance face is 90° and the exit face angle is 50.42°. One advantage of using this approach is that all components are physically linked, making alignment significantly easier, ensuring that the angular relationships will not significantly change with temperature. Examples of such athermalized devices are disclosed in Provisional Patent Application No. 60/153,913 which is herein incorporated by reference. One of ordinary skill in the art will recognize that any standard diffraction grating system or grisms can be used depending on the level of athermalized performance required by the system.

Optical compensators 42 and 62 may be of any suitable type, but there is disclosed, by way of example, a polished plate of glass having a precise thickness. However, any optical design or material that causes the optical path lengths traveled by the first fiber signal and the second fiber signal to be very nearly equal. For any beam combiner and half-wave retarder, optical compensators 42 and 62 are designed such that the wavelength channels from input fiber 1 and input fiber 2 may be exactly superimposed in angle and in space. This is achieved by choosing the thickness and material of the optical compensator, to satisfy the following equation:

$$T_o \frac{(n_o - n_a)}{n_o n_a} = \frac{H}{n_{bs}} - T_r \frac{n_r - n_a}{n_r n_a}$$

Where $T_o$ is the thickness of optical compensator 42 (62), $n_o$ is the optical index of compensator 42 (62), $n_a$ is the index of air, H is the difference in the distance traveled by the light from fiber input 1 as compared to input fiber 2 within the beam combiner, $n_{bs}$ is the index of the beam combiner material, $T_r$ is the thickness of the retarder, and $n_r$ is the optical index of the retarder material.

Polarization modulator 20 may be of any suitable type, but there is shown by way of example a linear liquid crystal device consisting of an array of pixels represented by reference numerals 22, 24, 26, and 28. In a 40 wavelength channel system, array 20 will consist of 40 switch cells 22. As depicted, each switch cell 22 is a twisted nematic liquid crystal device having liquid crystal molecules aligned in a twisted helix arrangement. One of ordinary skill in the art will recognize that the amount of rotation is dependent on the design of the liquid crystal helix arrangement and the temperature. As designed, the twisted helix configuration causes the polarization state of an incident light signal to rotate 90° by adiabatic following when no voltage or a relatively low voltage is applied to the device. For example, a relatively low voltage may be applied to compensate for temperature. The amount of rotation can be varied incrementally by applying a variable voltage to the liquid crystal pixel. In this scenario, WSS 10 would function as a variable optical attenuator. As is well known in the art, when a sufficient voltage (approximately 10V or greater) is applied, the helical arrangement formed by the liquid crystal molecules is disrupted and the polarization state of an incident light signal is passed through substantially unchanged. Thus, in an off-voltage switch state, or relatively low-voltage state, the polarization state of an incident light signal is rotated by ½ wave and p-polarized signals become s-polarized signals, and vice-versa In an on-voltage state, the polarization state is not rotated.

One of ordinary skill in the art will recognize that other polarization modulating devices can be used such as birefringent dependent crystals that have a variable birefringence dependent on the applied voltage. These crystals employ the same effect that is used by the liquid crystal device. One of ordinary skill in the art will also recognize that ferroelectric liquid crystal rotators, magneto-optical Farady rotators, acousto-optic rotators, and electro-optical rotators may also be employed as polarization modulator 20.

Figure 5:
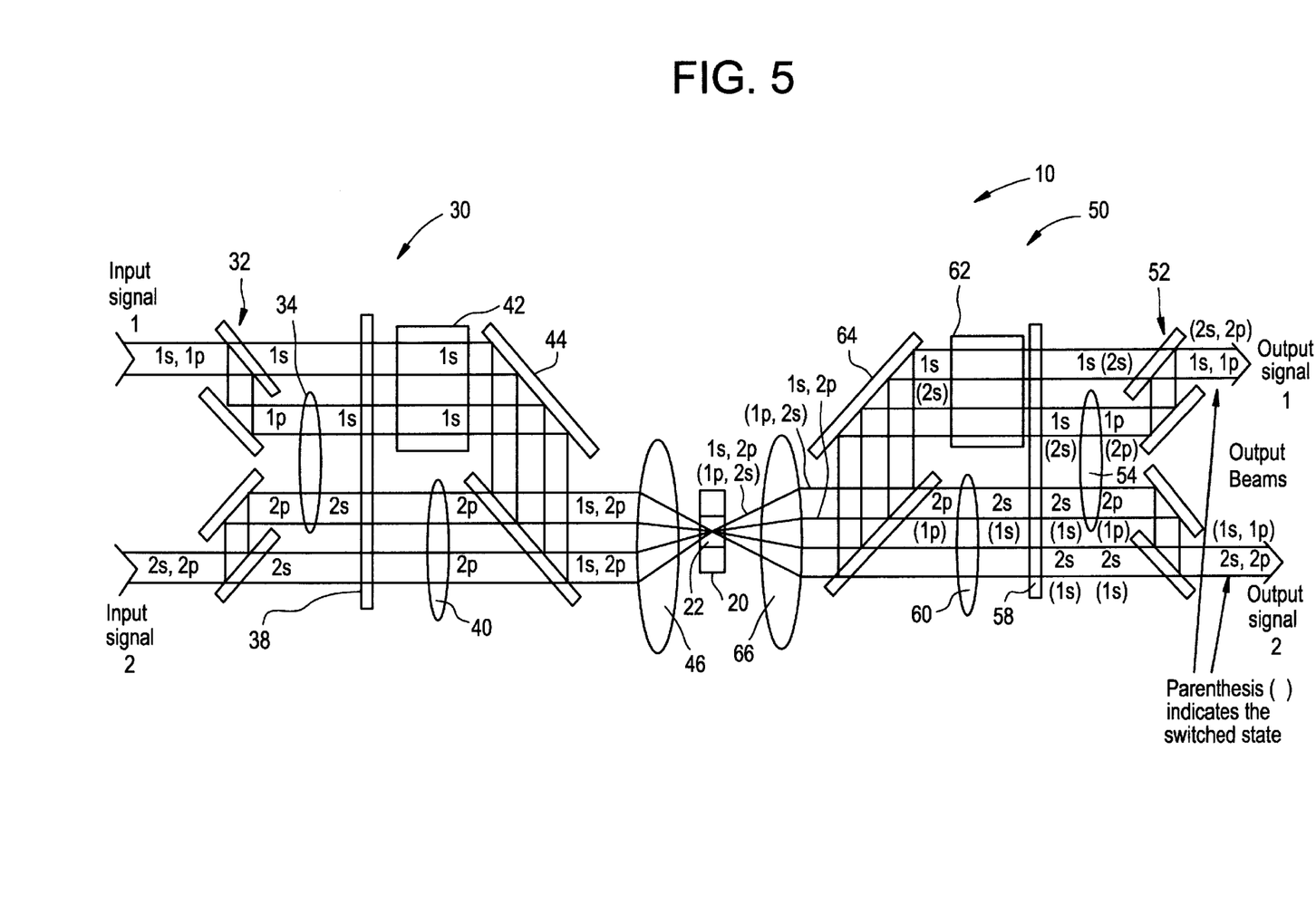
FIG. 5 is a diagram showing the polarization management architecture of the WSS depicted in FIGS. 1 and 2.

FIG. 5 illustrates the operation of WSS 10 from a polarization management perspective. Polarizing beamsplitter 32 separates input signals from the first fiber and second fiber into their parallel and orthogonal signal components. Thus, four beamlets (1s, 1p, 2s, 2p) exit beamsplitter 32. One of ordinary skill in the art will recognize that the convention used to number input fibers 1 and 2 is arbitrary and thus, can be reversed. As depicted, the p-polarized components from the first fiber signal and the second fiber signal (1p, 2p) pass through half-wave plate 34. One could reverse this convention and pass the orthogonal component through half-wave plate 34. Either way, after passing through half-wave plate 34, all four beamlets (1s, 1s, 2s, 2s) have the same polarization state. Grating 38 throughput is dependent on the polarization state of the incident beams. Thus, the uniform polarization is implemented to maximize grating 38 throughput and eliminate polarization dependent loss (PDL). Grating 38 demultiplexes the wavelengths being carried by the four beamlets, to create wavelength diversity. One skilled in the art will recognize that each wavelength carried by the beamlets is a separate communications channel carrying its own information payload. For each wavelength channel defined for fiber 1, there is a corresponding wavelength channel in fiber 2. The corresponding wavelength channels in fiber 1 and fiber 2 are occupied by substantially the same set of wavelengths. However, it is recognized that the information payload carried by the corresponding wavelength channels is different. By switching corresponding wavelength channels between fiber 1 and fiber 2, their respective information payloads are also switched between fiber 1 and fiber 2.

The two polarized beamlets derived from the second fiber signal passes through half-wave plate 40 creating polarization diversity. Thus, the first fiber wavelength channels, which do not pass through half-wave plate 40 remain s-polarized (1s, 1s), whereas the second fiber wavelength channels are polarized (2p, 2p).

One salient feature of the invention is that, absent optical compensator 42, the first fiber wavelength channels would travel a shorter physical distance. First fiber wavelength channels are passed through optical compensator 42 to equalize the optical distances of the first fiber wavelength channels and the second fiber wavelength channels. Optical distance is defined as the distance traveled by the light signal, divided by the refractive index of the propagation medium. This differs from the term "optical path length," which is defined as the distance traveled by the light signal, multiplied by the refractive index of the propagation medium. Signals that are corrected to have the same optical path length behave the same temporally, whereas signals corrected to have the same "optical distance" behave the same optically.

Optical compensator 42 also reduces dispersion created by grating 38. The dispersion of the wavelength channels created by the grating is smaller within optical compensator 42 as compared to the dispersion in air. Thus two sets of s-polarized wavelength channels that propagate through optical compensator 42 travel a longer physical distance from grating 38 to beam combiner 44 than do the two sets of p-polarized wavelength channels that do not propagate through optical compensator 42. However, the two sets of s-polarized wavelength channels experience substantially the same total dispersion as experienced by the two sets of p-polarized wavelength channels. Beam combiner 44 creates two identical sets of superimposed wavelength channels (1s, 2p) incident focusing lens 46. By superimposing each of the s-polarized wavelength channels with its corresponding p-polarized wavelength channel, each superimposed wavelength channel includes the information payload from the first fiber wavelength channel (1s) and the second fiber wavelength channel (2p). Lens 46 focuses each superimposed wavelength channel onto its respective liquid crystal switch cell 22 to thereby combine the two identical sets of information into one superimposed wavelength channel incident on switch cell 22.

In the high-voltage state, the polarization state of a superimposed wavelength channel at the output of switch cell 22 is unchanged relative to the polarization state of the same superimposed wavelength channel at the input of switch cell 22. In the off-voltage state, switch cell 22 converts (1s, 2p) into (1p, 2s) by the polarization rotation technique described above and the polarization state of a superimposed wavelength channel at the output of switch cell 22 is rotated 90° relative to the polarization state of the same superimposed wavelength channel at the input of switch cell 22.

As noted previously, the output birefringent optical system 50 is exactly symmetrical to the input birefringent optical system 30, described in the paragraph above. In the high voltage state, channel (1s,1p) is included in the first fiber output and channel (2s,2p) in the second fiber output. This is the wavelength channel pass-through state. In the low-voltage state, channel (2s, 2p) is inserted in the first fiber output and channel (1s,1p) into the second fiber output. In this switch state, information carried by a wavelength channel in the first fiber is switched into the second fiber output, and information carried by the corresponding wavelength channel in the second fiber is switched into the first fiber.

A discussion of some of the features and benefits of the present invention follows. In the present invention, half-wave plate 40 is placed between grating 38 and polarizing beam combiner 44 allowing polarization beam combiner 44 to be disposed between lens 46 and grating 38. Polarizing beam splitter 64 in the output birefringent optical system 50 is likewise disposed between lens 66 and grating 58. This symmetrical optical design is one of the keys to maintaining high performance with this architecture. The polarizing beam splitters/combiners are all used in nearly collimated space. This is instrumental in maximizing the extinction ratio and minimizing cross-talk. The present invention eliminates the need to use a Wollaston Prism, or another birefringent element, between lens 46 and polarization modulator 20. With respect to input birefringent optical system 30, any birefringent element disposed between lens 46 and polarization modulator 20 will introduce asymmetries in the optical characteristics of light originating from fiber 1 relative light originating from fiber 2. The same analysis is true with respect to output birefringent optical system 50. As discussed above, the present invention allows the use of alternative polarizers, such as beamsplitting cubes and thin films filters, when used in combination with optical compensators 42, 62. Both of these devices are capable of recombining the two polarization components such that they are exactly superimposed and have exactly the same cone angle. Finally, as shown in FIG. 3, the beams are incident along the horizontal axis of the focusing lens (i.e. are on-axis in one dimension). Consequently, more of the transmitted light is directed into the central part of the lens aperture. This typically allows greater optical performance to be achieved with a given lens configuration as compared to state-of-the-art architectures wherein very little light passes through the center of the lens aperture.

As embodied herein and depicted in FIG. 6, a perspective view of an embedded glass mechanical design of WSS 10 is disclosed, in accordance with a second embodiment of the invention. In this embodiment all components are physically linked. Collimator assembly 120 is physically connected to beam splitter assembly 32. Beam splitter assembly 32 is physically connected to half-wave retarder 34. Half-wave retarder 34 is physically connected to grating assembly 38. Grating assembly 38 is physically connected to half-wave retarder 40 and optical compensator assembly 42. These components, in turn, are physically connected to beam combiner 44, which is connected to lens 46. Each of the assemblies is fastened in place to equipment base plate 100 using various screws, washers, and the like. Since the output birefringent optical system 50 is the mirror image of the input birefringent optical system 30, the arrangement is the same.

The embedded design depicted in FIG. 6 has several advantages. First, most of the components are linked thermally and physically. This mitigates several environmental problems. Because the components are physically linked, there is thermal linkage and heat can be effectively channeled away from sensitive components to thereby produce a more athermalized design. Similarly, by linking the components, they are less likely to be susceptible to mechanical stresses caused by vibration. Finally, the embedded mechanical design depicted in FIG. 4 lowers assembly costs.

Figure 7:
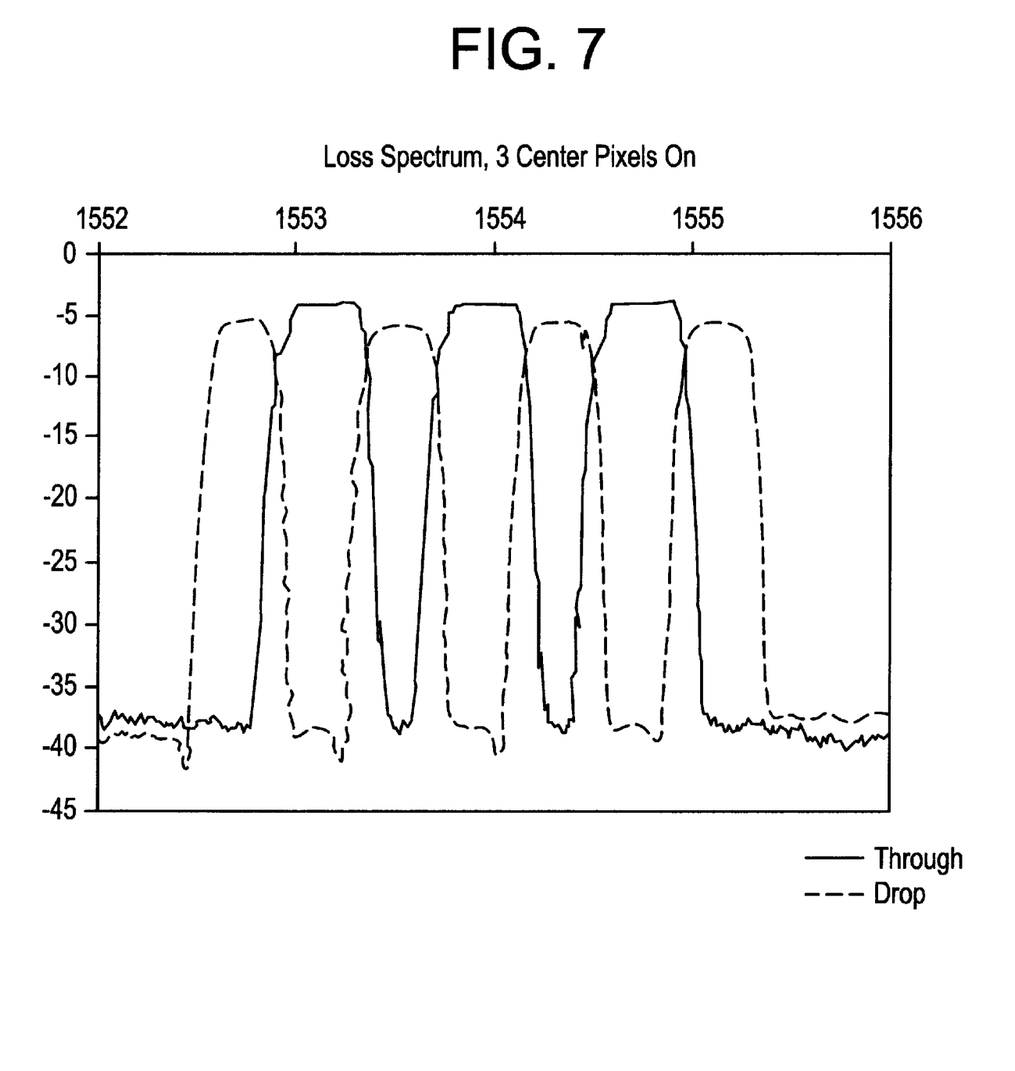
FIG. 7 is a plot showing the channel profiles of the WSS of the present invention.
Figure 8:
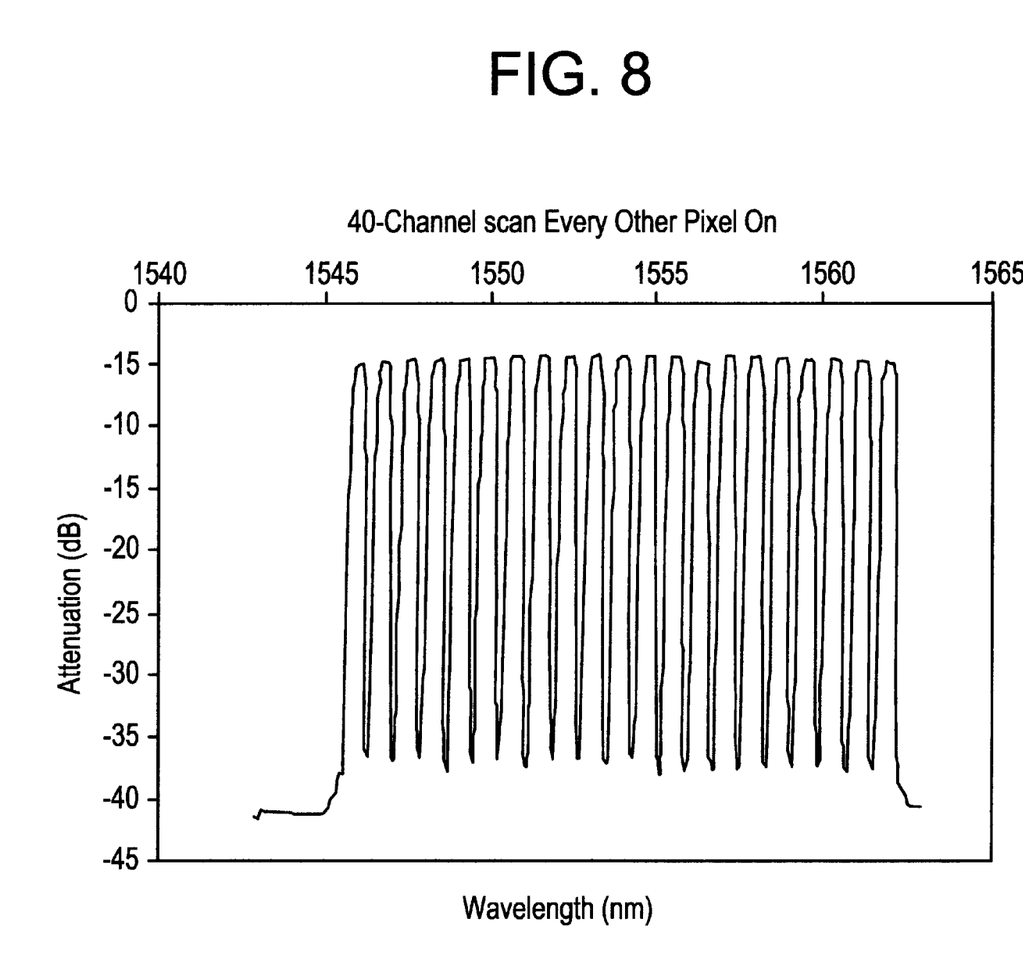
FIG. 8 is a plot showing the broadband ripple of a 40-channel WSS of the present invention.
Figure 9:
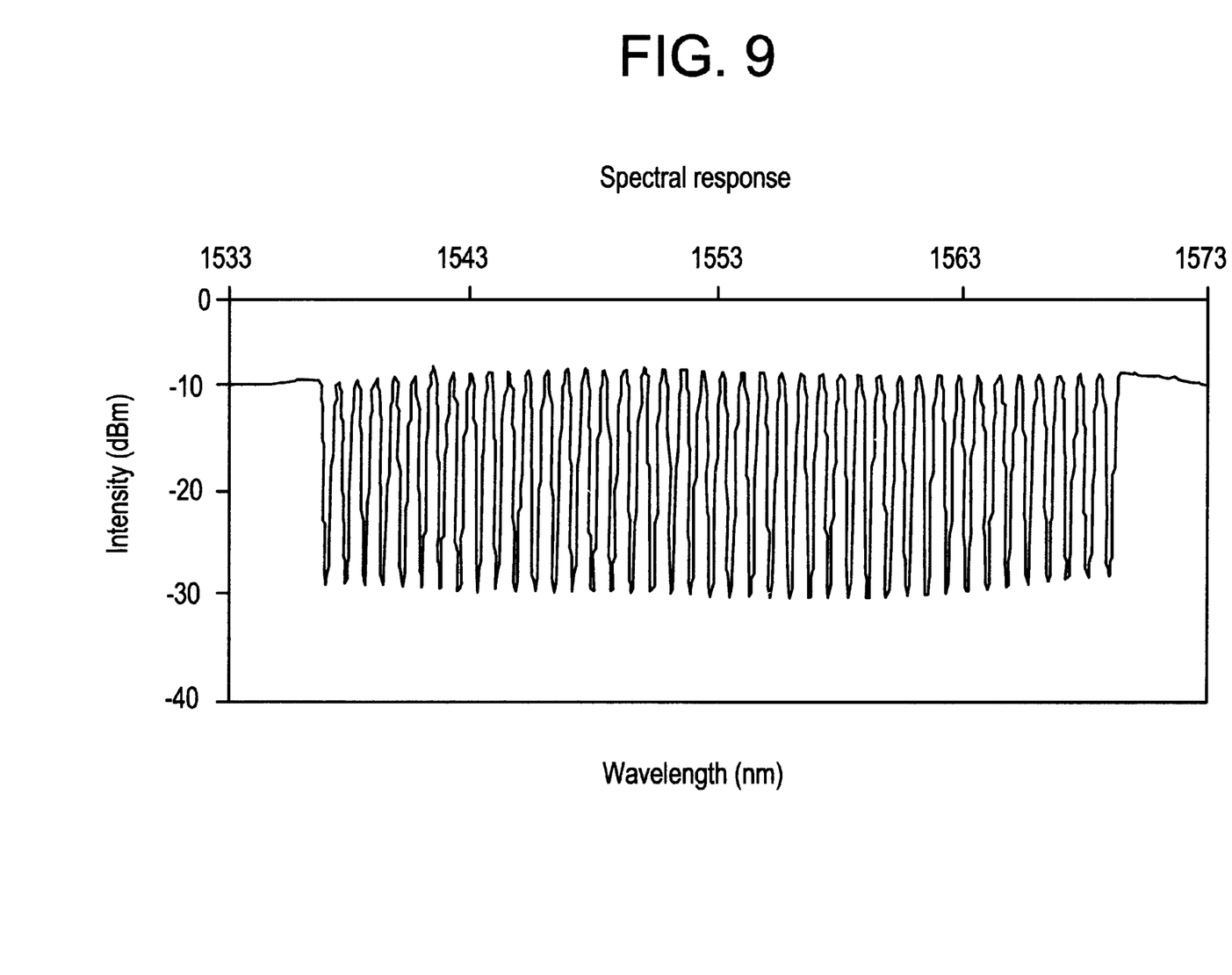
FIG. 9 is a plot showing the broadband ripple of a 80-channel WSS of the present invention.

As embodied herein and depicted in FIGS. 7–9, performance data obtained from WSS 10 are disclosed. In FIG. 7, channel profiles of the superposition of add and drop traces are shown. Intra-channel cross-talk is between –35 db and –40 dB. The drop channel insertion loss is approximately 2 dB greater than the through channels. In FIG. 8, the broadband ripple of a 40 channel switch is shown. The data was taken using a tunable laser and an optical spectrum analyzer. Forty-50 GHz channels are shown with every second pixel received. Again, the troughs are between –35 db and –40 dB. In FIG. 9, performance data showing the broadband ripple of an 80 channel switch is shown. Eighty 50-GHz channels are shown with every second pixel received. The data was taken with an optical spectrum analyzer using an ASE source. In FIG. 9, troughs do not reach –35 dB because of overfilling of channel bands and lack of resolution of the OSA.

Figure 10:
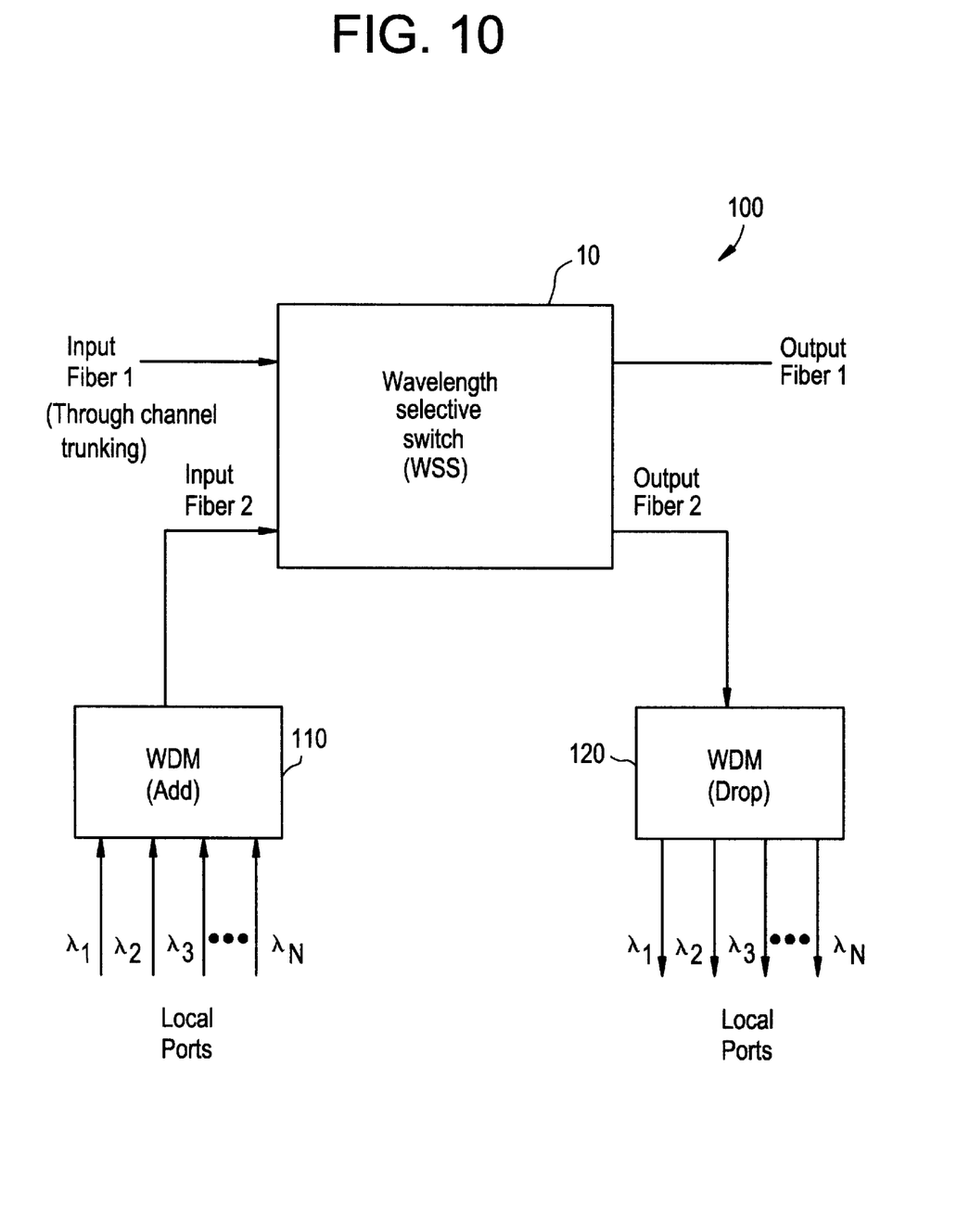
FIG. 10 is a block diagram of a WADM that incorporates the WSS in accordance with a third embodiment of the present invention.

As embodied herein and depicted in FIG. 10, WADM 100, incorporating WSS 10, is disclosed in accordance with a third embodiment of the invention. WSS 10 is well suited to function as the key component of a Wavelength Add Drop Multiplexer (WADM). As depicted, WSS 10 is connected to input fiber 1 and input fiber 2 which are connected to wavelength multiplexer 10. WSS 10 is also connected to output fiber 1 and output fiber 2. Output fiber 2 is connected to wavelength de-multiplexer 120. Multiplexer 10 is connected to N-local ports which are wavelength channels matched to WSS 10. The local ports are the source of the local traffic that is to be added to the fiber trunk represented by input fiber 1 and output fiber 1. De-multiplexer 120 is the sink for local traffic.

Wavelength channels that are to be dropped into local traffic are switched by WSS from input fiber 1 into output fiber 2, using the techniques described above with respect to FIGS. 1–5. The dropped wavelength channels are replaced by the local wavelength channels that are input into multiplexer 110. Thus, each local traffic payload is modulated at a wavelength corresponding to one of the dropped wavelength channels and inserted into the empty wavelength slot created by the dropped channel avoiding wavelength contention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical device for selectively directing a first signal and a second signal to a selected output, said optical device comprising: a birefringent optical system having a system input that receives the first signal and the second signal, and a system output to which said birefringent optical system transmits a superimposed signal formed by superimposing a first polarized signal and a second polarized signal, wherein said first polarized signal and said second polarized signal are polarized versions of the first signal and the second signal, respectively; and a polarization modulator coupled to said system output, whereby said polarization modulator selectively rotates a polarization state of said superimposed signal, wherein the polarization modulator is selected from the group consisting of a birefringent crystal switch, a twisted nematic liquid crystal switch, a ferroelectric liquid crystal switch, a cholesteric liquid crystal switch, a magneto-optical Farady rotator, an acousto-optic rotator, or an electro-optical rotator and wherein an optical distance of the first polarized signal from the system input to the polarization modulator is substantially equal to an optical distance of the second polarized signal from the system input to the liquid crystal switch.

2. An optical device for selectively directing a first signal and a second signal to a selected output, said optical device comprising:

a birefringent optical system having a system input that receives the first signal and the second signal, and a system output to which said birefringent optical system transmits a superimposed signal formed by superimposing a first polarized signal and a second polarized signal, wherein said first polarized signal and said second polarized signal are polarized versions of the first signal and the second signal, respectively; and a polarization modulator coupled to said system output, whereby said polarization modulator selectively rotates a polarization state of said superimposed signal, wherein the birefringent optical system further comprises an input birefringent optical system coupled to a light incident side of the polarization modulator and an output birefringent optical system coupled to a light transmitting side of the polarization modulator, and wherein the input birefringent optical system further comprises a polarization beam splitter connected to the system input, said splitter separates the first signal into first signal polarization components and the second signal into second signal polarization components, and a first half-wave retarder disposed in a path of a polarized component for each of said first signal polarization components and said second polarization components to create first signal uniformly polarized components and second signal uniformly polarized components.

3. The optical device of claim 2, wherein the first signal uniformly polarized components and the second signal uniformly polarized components are s-polarized.

4. The optical device of claim 2, wherein the first signal uniformly polarized components and the second signal uniformly polarized components are p-polarized.

5. The optical device of claim 2, wherein the input birefringent optical system further comprises:

a second half-wave retarder disposed in a path of either of the first signal uniformly polarized components or the second signal uniformly polarized components, whereby the first signal uniformly polarized components are orthogonally polarized relative to the second signal uniformly polarized components; and a polarization beam combiner coupled to said second half-wave retarder, whereby the first signal uniformly polarized components are combined with the second signal uniformly polarized components to form two superimposed signals.

6. The optical device of claim 5, further comprising a lens for focusing the two superimposed signals onto the polarization modulator.

7. The optical device of claim 5, wherein the polarization beam splitter and the polarization beam combiner are selected from the group consisting of a parallel plate beamsplitter, a birefringent crystal, a beam splitting prism, a beamsplitting cube, or one or more thin film filters.

8. An optical device for selectively directing a first signal and a second signal to a selected output, said optical device comprising:

a first polarization beam splitter for separating the first signal and second signal into first signal polarization components and second signal polarization components, respectively;

a first half-wave retarder coupled to said polarization beam splitter, said first half-wave retarder causes all of said first signal polarization components and said second signal polarization components to be uniformly polarized in a first polarization state;

a first grating coupled to said first half-wave retarder, for producing a plurality of first signal wavelength channels and a plurality of second signal wavelength channels;

a second half-wave retarder coupled to said first grating, for causing said plurality of second signal wavelength channels to be uniformly polarized in a second polarization state;

a first optical compensator coupled to said first grating, for causing an optical distance of said plurality of first signal wavelength channels to be substantially equal to an optical distance of said plurality of second signal wavelength channels;

a first polarization beam combiner coupled to said optical compensator and said second half-wave retarder, for combining said plurality of first signal wavelength channels and said plurality of second signal wavelength channels into a plurality of superimposed wavelength channels;

a focusing lens coupled to said polarization beam combiner; and an array of polarization modulators coupled to said focusing lens, each of said modulators has a switch state, wherein each superimposed wavelength channel is focused onto a predetermined modulator.

9. The optical device of claim 8, wherein the array of polarization modulators comprises an array of liquid crystal pixels.

10. The optical device of claim 9, wherein the liquid crystal pixel selectively rotates the polarization state of the superimposed wavelength channel to thereby direct the first signal wavelength channel and the second signal wavelength channel into a selected output signal.

11. The optical device of claim 9, further comprising:

a second lens coupled to the array of liquid crystal pixels to substantially collimate each superimposed output wavelength channel directed out of the array of liquid crystal pixels;

a second polarization beam splitter coupled to said second lens, for separating superimposed output wavelength channels into first output wavelength channels and second output wavelength channels determined by the switch state of their corresponding liquid crystal pixel;

a third half-wave retarder coupled to said second polarization beam splitter, for converting said plurality of second output wavelength channels into the first polarization state;

a second optical compensator coupled to said second polarization beam splitter, for causing an optical path length of said plurality of first output wavelength channels to be substantially equal to an optical path length of said plurality of second output wavelength channels;

a second grating coupled to said third half-wave retarder and said second optical compensator, for multiplexing said plurality of first output wavelength channels into at least one first output signal component and said plurality of second output wavelength channels into at least one second output signal component, wherein said first output signal component and said second output signal component have the same polarization state;

a fourth half-wave retarder coupled to said second grating, said fourth half-wave retarder causes said at least one first output signal component to have a first parallel polarized component and a first orthogonal polarized component, and also causes said at least one second signal output component to have a second parallel polarized component and a second orthogonal polarized component; and a second polarization beam combiner coupled to said second grating and said fourth half-wave retarder, for combining said first parallel component and said first orthogonal component into a first output signal and said second parallel component and said second orthogonal component into a second output signal.

12. A method for selectively directing a first signal and a second signal to a selected output in an optical device that includes a birefringent optical system, said method comprising:

providing an array of liquid crystal pixels, wherein each of said liquid crystal pixels includes a switch state;

demultiplexing the first signal and the second signal to thereby form a plurality of first signal wavelength channels and a plurality of second signal wavelength channels, respectively;

superimposing each first signal wavelength channel over its corresponding second signal wavelength channel to thereby form a plurality of superimposed wavelength channels; and focusing each superimposed wavelength channel onto a predetermined liquid crystal pixel, wherein said demultiplexing step further comprises:

converting the first signal into a first parallel component and a first perpendicular component, and the second signal into a second parallel component and a second perpendicular component;

converting said first parallel component and said first perpendicular component into two first perpendicular components, and said second parallel component and said second perpendicular component into two second perpendicular components; and demultiplexing said two first perpendicular components and said two second perpendicular components to form two sets of first signal perpendicular wavelength channel components and two sets of second signal perpendicular wavelength channel components, respectively.

13. A method for selectively directing a first signal and a second signal to a selected output in an optical device that includes a birefringent optical system, said method comprising:

providing an array of liquid crystal pixels, wherein each of said liquid crystal pixels includes a switch state;

demultiplexing the first signal and the second signal to thereby form a plurality of first signal wavelength channels and a plurality of second signal wavelength channels, respectively;

superimposing each first signal wavelength channel over its corresponding second signal wavelength channel to thereby form a plurality of superimposed wavelength channels; and focusing each superimposed wavelength channel onto a predetermined liquid crystal pixel, wherein the step of superimposing further comprises converting the two sets of second signal perpendicular wavelength channel components into two sets of second signal parallel wavelength channel components and combining the two sets of first signal perpendicular wavelength channel components with said two sets of second signal parallel wavelength channel components, to form a first set of superimposed wavelength channels and a second set of superimposed wavelength channels.

14. The optical device of claim 1 wherein the first polarized signal is mapped into a first linearly polarized state and the second polarized signal is mapped into a second linearly polarized state, orthogonal to said first linearly polarized state.

15. The optical device of claim 1, wherein the first polarized signal is mapped into a first circularly polarized state and the second polarized signal is mapped into a second circularly polarized state, orthogonal to said first circularly polarized state.

16. The optical device of claim 1, wherein the liquid crystal switch is selected from the group consisting of a twisted nematic liquid crystal switch, a ferroelectric liquid crystal switch, or a cholesteric liquid crystal switch.

17. The optical device of claim 1, wherein the first polarized signal and the second polarized signal are superimposed such that they are co-linear in at least one-axis of an optical path.

18. The optical device of claim 1, wherein the birefringent optical system is symmetrical about the polarization modulator.

19. The optical device of claim 2, wherein said input birefringent optical system and said output birefringent optical system are symmetrical around the liquid crystal switch.

20. The optical device of claim 19, wherein the optical device is bidirectional.

21. An optical device for selectively directing a first signal and a second signal to a selected output, said optical device comprising: a birefringent optical system having a system input that receives the first signal and the second signal, and a system output to which said birefringent optical system transmits a superimposed signal formed by superimposing a first polarized signal and a second polarized signal, wherein said first polarized signal and said second polarized signal are polarized versions of the first signal and the second signal, respectively; and a polarization modulator coupled to said system output, whereby said polarization modulator selectively rotates a polarization state of said superimposed signal, and wherein an optical distance of the first polarized signal from the system input to the polarization modulator is substantially equal to an optical distance of the second polarized signal from the system input to the liquid crystal switch.

22. The optical device of claim 21 wherein the first polarized signal is mapped into a first linearly polarized state and the second polarized signal is mapped into a second linearly polarized state, orthogonal to said first linearly polarized state.

23. The optical device of claim 21, wherein the first polarized signal is mapped into a first circularly polarized state and the second polarized signal is mapped into a second circularly polarized state, orthogonal to said first circularly polarized state.

24. The optical device of claim 21, wherein the polarization modulator is selected from the group consisting of a birefringent crystal switch, a twisted nematic liquid crystal switch, a ferroelectric liquid crystal switch, a cholesteric liquid crystal switch, a magneto-optical Farady rotator, an acousto-optic rotator, or an electro-optical rotator.

25. The optical device of claim 24, wherein the liquid crystal switch is selected from the group consisting of a twisted nematic liquid crystal switch, a ferroelectric liquid crystal switch, or a cholesteric liquid crystal switch.

26. The optical device of claim 21, wherein the first polarized signal and the second polarized signal are superimposed such that they are co-linear in at least one-axis of an optical path.

27. The optical device of claim 21, wherein the birefringent optical system is symmetrical about the polarization modulator.

28. An optical device for selectively directing a first signal and a second signal to a selected output, said optical device comprising:

a birefringent optical system having a system input that receives the first signal and the second signal, and a system output to which said birefringent optical system transmits a superimposed signal formed by superimposing a first polarized signal and a second polarized signal, wherein said first polarized signal and said second polarized signal are polarized versions of the first signal and the second signal, respectively; and a polarization modulator coupled to said system output, whereby said polarization modulator selectively rotates a polarization state of said superimposed signal, wherein the input birefringent optical system further comprises a polarization beam splitter connected to the system input, so as to be able to separate the first signal into first signal polarization components and the second signal into second signal polarization components, and wherein a first half-wave retarder is disposed in a path of a polarized component for each of said first signal polarization components and said second polarization components to create first signal uniformly polarized components and second signal uniformly polarized components.

29. The optical device of claim 28, wherein the first signal uniformly polarized components and the second signal uniformly polarized components are s-polarized.

30. The optical device of claim 28, wherein the first signal uniformly polarized components and the second signal uniformly polarized components are p-polarized.

31. The optical device of claim 28, wherein the input birefringent optical system further comprises:

a second half-wave retarder disposed in a path of either of the first signal uniformly polarized components or the second signal uniformly polarized components, whereby the first signal uniformly polarized components are orthogonally polarized relative to the second signal uniformly polarized components; and a polarization beam combiner coupled to said second half-wave retarder, whereby the first signal uniformly polarized components are combined with the second signal uniformly polarized components to form two superimposed signals.

32. The optical device of claim 31, further comprising a lens for focusing the two superimposed signals onto the polarization modulator.

33. The optical device of claim 31, wherein the polarization beam splitter and the polarization beam combiner are selected from the group consisting of a parallel plate beamsplitter, a birefringent crystal, a beam splitting prism, a beamsplitting cube, or one or more thin film filters.

34. The optical device of claim 28, wherein said input birefringent optical system and said output birefringent optical system are symmetrical around the liquid crystal switch.

35. The optical device of claim 28, wherein the optical device is bidirectional.

* * * * *